Patented July 4, 1939

2,164,440

UNITED STATES PATENT OFFICE 2,164,440

PROCESS FOR THE PREPARATION OF TRIMETHYLOLNITROMETHANE

Joseph A. Wyler, Allentown, Pa., assignor to Trojan Powder Company, Allentown, Pa.

No Drawing. Application June 4, 1938, Serial No. 211,802

9 Claims. (Cl. 260—635)

My invention relates to the condensation of nitro-alkyls with aldehydes in the presence of an alkali. More particularly, my invention relates to the condensation of nitromethane with formaldehyde and is specifically concerned with the condensation of nitromethane to form trimethylolnitromethane.

It is well known that nitromethane reacts in water, methyl alcohol, ethyl alcohol, and ethyl acetate solutions of formaldehyde or paraformaldehyde, to form trimethylolnitromethane. The reaction may be expressed by the general equation:

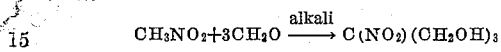

In all known processes the reaction product is a difficultly crystallizable mixture. This is due to the very high solubility of trimethylolnitromethane in water, methyl alcohol, etc., and to other factors such as the presence of

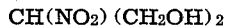

and $CH_2(NO_2)CH_2OH$, and the decomposition of the trimethylolnitromethane upon evaporation at elevated temperatures.

I have discovered that if the condensation of the $CH_3NO_2$ with $CH_2O$ is effected in aliphatic alcohols which are essentially insoluble or rather difficultly soluble in water that a readily crystallizable reaction product results. This is a new and very useful result.

It is an object of my invention to provide a process for the preparation of trimethylolnitromethane in which the separation of the trimethylolnitromethane from its impurities is readily effected. Another object is to prevent or minimize the effects of side reactions such as the following:

1. $CH(NO_2)(CH_3OH)_3 \rightleftharpoons C(NO_2)H_2(CH_2OH)+CH_2O$
2. $CH_2(NO_2)(CH_2OH) \rightleftharpoons CH_3NO_2+CH_2O$
3. $C(NO_2)(CH_3OH)_3 \rightleftharpoons CH(NO_2)(CH_2OH)_2+CH_2O$ which of course affect the yield.

A still further object is to avoid the necessity of evaporation of the solvent after each condensation. Other and further objects will also be disclosed in the specification and claims.

As mentioned above, in all known processes for condensing nitromethane with formaldehyde or paraformaldehyde a thick, syrupy product results. This necessitates an evaporation step in order to obtain crystals of the trimethylolnitromethane; and the evaporation operation must be done either in vacuo or at an elevated temperature. The former is expensive and the latter causes appreciable decomposition.

I have discovered that carrying out this condensation in butyl, amyl, or hexyl alcohol, yields a reaction product which can be readily crystallized, and a mother liquor which can be reused in a succeeding batch—no intermediate evaporation being required. Furthermore, my process produces a product which is free from the brown color invariably present in the product made in accordance with known processes.

In order more particularly to point out my invention the following examples are given by way of illustration:

Example 1

Thirty parts (by weight) of paraformaldehyde are added to 100 parts (by weight) of butyl alcohol. Then, 20 parts (by weight) of nitromethane and sufficient sodium bicarbonate to produce an alkalinity in the mixture are added. An alkalinity just great enough to turn litmus paper from red to violet is sufficient, although a greater alkalinity may be used. The mixture is heated, with stirring, up to about 70–80° C., when the reaction itself will raise the temperature to 90–105° C. The reaction mixture will become clear, except for the excess of sodium bicarbonate and mechanical impurities. The mixture is kept at 90–105° C. for about a half-hour or more, then filtered hot or decanted and allowed to cool. A copious crop of colorless prismatic crystals is formed. These crystals are filtered, washed on the filter with fresh butyl alcohol, and then dried at elevated temperature. The mother liquor and wash liquor are united and used in a later condensation.

Example 2

About 120 parts (by weight) of mother liquor containing some wash liquor, 30 parts (by weight) of paraformaldehyde, 20 parts (by weight) of nitromethane, and sufficient $NaHCO_3$ to produce an alkalinity in the solution are heated, etc., as in Example #1.

The crystals, and mother liquor are handled in the same manner as above.

It is, of course, to be understood that I have given certain specific details in the examples, merely to point out my invention and for purposes of clarity; and I do not confine myself to these particular operative details. Thus, I may vary the proportions of reagents in order to have an excess of one or the other. In general, I prefer to use a 5% excess of the formaldehyde. Then, I may use such alkalies as $KHCO_3$, $KOH$, $Na_2CO_3$, $Ca(OH)_2$, $K_2CO_3$, etc. Also, I may use any of the butyl alcohols, amyl alcohols, or hexyl alcohols or mixtures of these, and if my purpose is to obtain fine, short crystals, I prefer normal amyl alcohol. In regard to temperature—I prefer 90–100° C., but I may use a lower or higher one. Similarly, the time of reaction may vary from one-half hour to several hours depending upon concentrations, temperatures, alkali used, etc. In other words, I may make any such changes in operative details of my process as would occur to a workman skilled in this art and I do not limit myself in any way except as indicated in the following claims.

I claim:

1. The process for the preparation of trimethylolnitromethane which comprises condensing mononitromethane with formaldehyde in an alkaline medium comprising a monohydric aliphatic alcohol containing from four to six carbon atoms.

2. The process for the preparation of trimethylolnitromethane which comprises condensing mononitromethane with formaldehyde in an alkaline medium comprising normal butyl alcohol.

3. The process for the preparation of trimethylolnitromethane which comprises condensing mononitromethane with formaldehyde in an alkaline medium comprising normal amyl alcohol.

4. The process for the preparation of trimethylolnitromethane which comprises condensing mononitromethane with formaldehyde in an alkaline medium comprising a mixture of normal butyl alcohol and normal amyl alcohol.

5. The process for the preparation of trimethylolnitromethane which comprises condensing mononitromethane with formaldehyde in an alkaline medium comprising normal butyl alcohol, said mononitromethane and formaldehyde being present in the alkaline medium in the molecular proportions of one to three.

6. The process for the preparation of trimethylolnitromethane which comprises heating an alkaline mixture comprising mononitromethane, formaldehyde, (said mononitromethane and formaldehyde being present in the molecular proportions of one to three) and a monohydric aliphatic alcohol containing from 4 to 6 carbon atoms, to a temperature of 80–105° C. until completion of the reaction, then cooling this mixture and separating the crystals of trimethylolnitromethane therefrom.

7. The process for the preparation of trimethylolnitromethane which comprises heating a mixture comprising sodium bicarbonate, mononitromethane, formaldehyde, (said mononitromethane and formaldehyde being present in the molecular proportions of one to three) and butyl alcohol, to a temperature of 80–105° C. until condensation is complete, then cooling this mixture and separating the crystals of trimethylolnitromethane therefrom.

8. The process for the preparation of trimethylolnitromethane which comprises heating an alkaline mixture comprising mononitromethane, formaldehyde, (said mononitromethane and formaldehyde being present in the molecular proportions of one to three) and mother liquor from a previous condensation made as described in claim 6, to a temperature of 80–105° C. until completion of the reaction, then cooling this mixture and separating the crystals of trimethylolnitromethane therefrom.

9. The process for the preparation of trimethylolnitromethane which comprises heating a mixture comprising sodium bicarbonate, mononitromethane, paraformaldehyde, (said mononitromethane and paraformaldehyde being present in equal molecular proportions) and butyl alcohol, to a temperature of 80–105° C. until condensation is complete, then cooling this mixture and separating the crystals of trimethylolnitromethane therefrom.

JOSEPH A. WYLER.

DISCLAIMER 2,164,440.—*Joseph A. Wyler*, Allentown, Pa. PROCESS FOR THE PREPARATION OF TRIMETHYLOLNITROMETHANE. Patent dated July 4, 1939. Disclaimer filed August 16, 1940, by the assignee, *Trojan Powder Company*.

Hereby enters this disclaimer to claims 1, 2, and 5 in said patent.

[*Official Gazette September 10, 1940.*]